July 21, 1964 P. A. GUINARD ETAL 3,141,475
REGULATING VALVE FOR A PUMP CONTROLLED BY
A PRESSURE RESPONSIVE SWITCH
Filed May 31, 1961 5 Sheets-Sheet 1
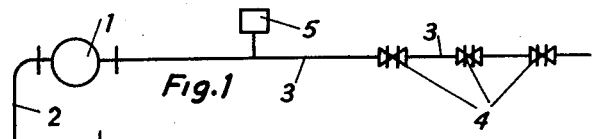
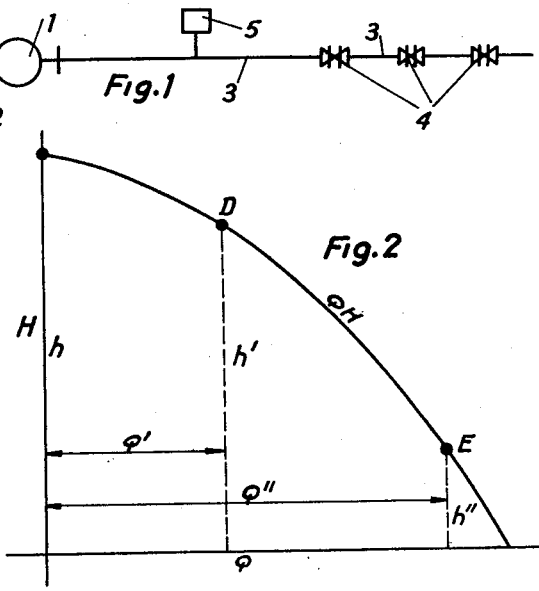
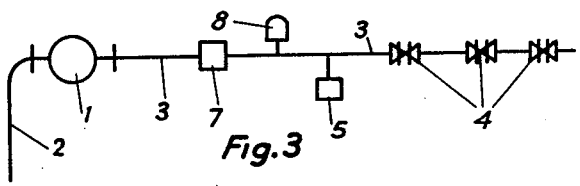
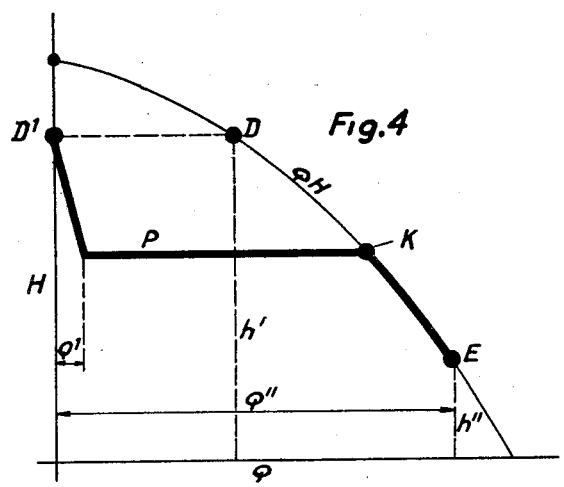

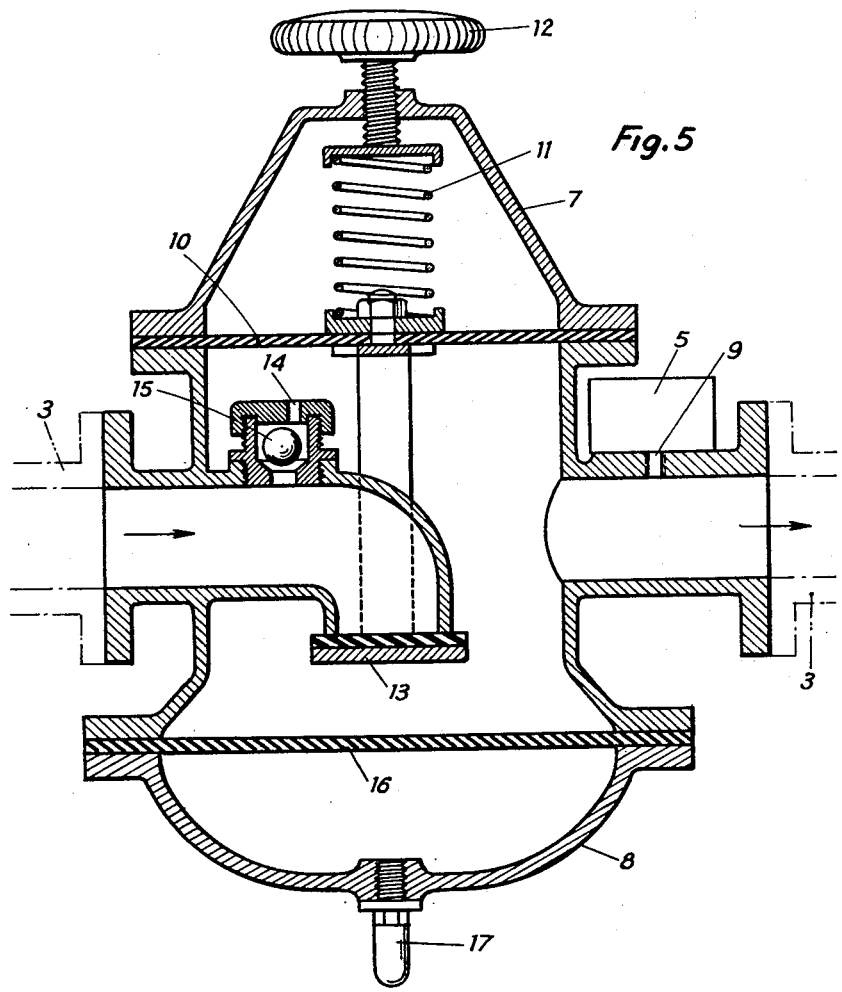
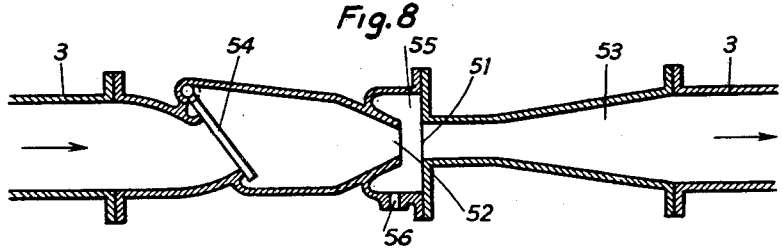

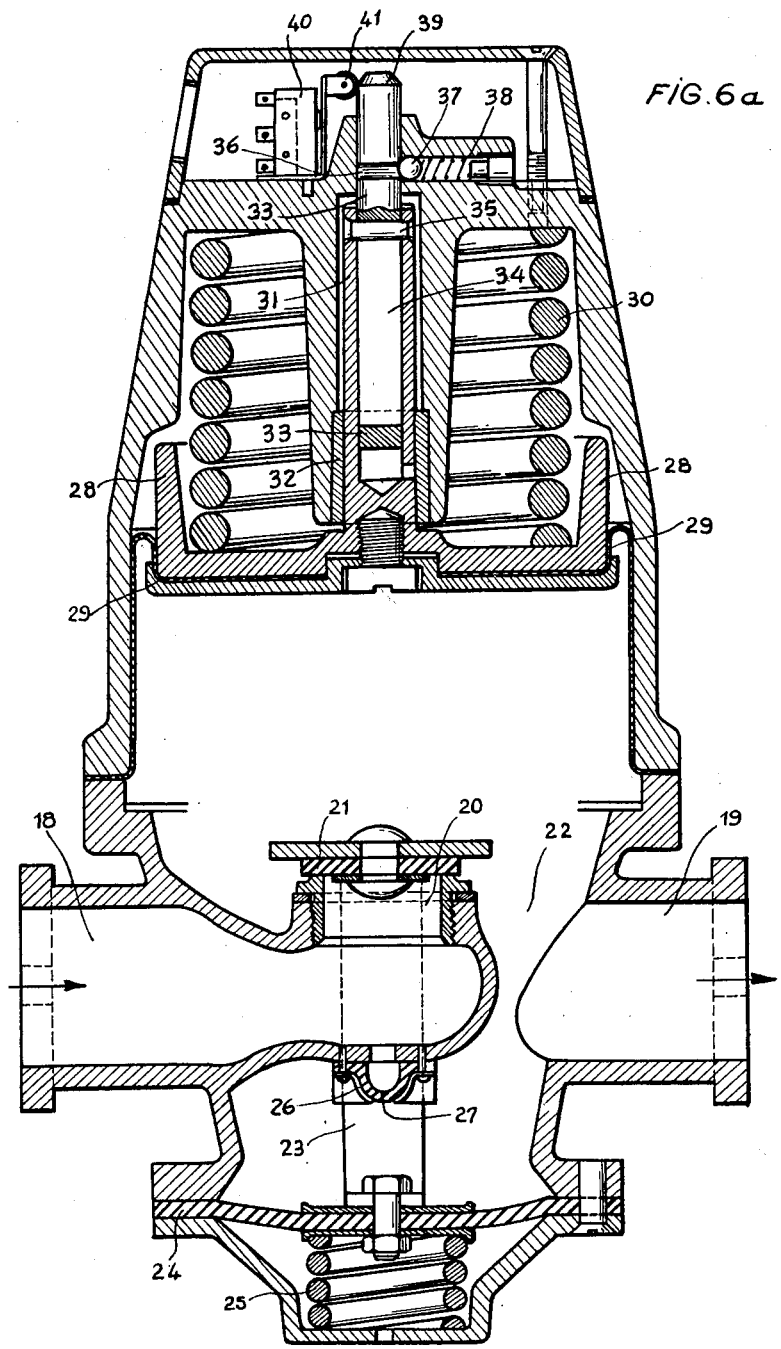

United States Patent Office 3,141,475
Patented July 21, 1964

3,141,475
REGULATING VALVE FOR A PUMP CONTROLLED BY A PRESSURE RESPONSIVE SWITCH
Paul André Guinard, 6 Rue Montesquiou, Saint-Cloud, France, and Gérard Georges Jean Berger, Mercey, France
Filed May 31, 1961, Ser. No. 113,806
Claims priority, application France June 2, 1960
5 Claims. (Cl. 137—568)

The present invention relates to improvements in apparatus for the delivery of a liquid from a pump.

Apparatus for the delivery of water under pressure supplied by a motorpump set heretofore included a container receiving a storage of water and air under pressure which acts upon a contactor to close or to open the circuit of the motor as soon as the pressure in the container drops below or rises above predetermined values. In addition, as the stored air progressively dissolves in the water, it is necessary to replenish this quantity of air, either periodically with independent means, either, at each starting up, or with self-acting devices provided for that purpose. In order to simplify the above apparatus, it has heretofore been proposed to eliminate both the container with air under pressure and the device for supplying the additional air. It is further known to cause the switch for controlling the circuit of the motor of the motor-pump set to be automatically operated at the opening of the first drawing cock or at the closing of the last drawing cock, as a consequence of the decrease or of the increase of the pressure in the main discharge pipe of the pump and when this pressure reaches lower and upper predetermined values, the opening of the contactor is also eventually produced by the stopping of the flow in this main pipe.

However, the operation of such arrangements is not satisfactory due to the relationship between the variation of the pressure of a centrifugal pump as a function of the output or flow of the delivered liquid, said pressure rapidly decreasing when the flow increases. Assuming that the pressure responsive switch controlling the circuit of the motor driving the pump is itself controlled by the pressure of the main delivery piping, i.e. by the delivery pressure of the pump, the value of the pressure corresponding to the stopping of the motor should be substantially lower than the maximum delivery pressure of the pump corresponding to a zero output in order to be sure that the motor pump will be stopped when all the delivery valves are closed. Now, if one of the delivery valves is slightly opened, causing a flow of liquid which is even smaller than the flow corresponding to the operation of the switch and to the stopping of the pump, the pressure in the delivery piping will rapidly drop and reach the lowest value corresponding to the closure of the contactor resulting in the start of the pump and rapid increase of pressure which will cause again the opening of the switch and the stopping of the pump, the cycle recommencing at such a fast rate that the motor will be quickly damaged by the frequently repeated startings and stoppings. In order to reduce the frequency of said operation cycles of the pump, the known arrangements usually comprise an auxiliary air pressure tank connected to the delivery piping and which is refilled with a certain amount of liquid at each starting of the pump, said amount of liquid being sufficient to compensate during a relatively long period the occurring leakage or slight opening of a delivery valve and to prevent a rapid drop of the pressure in the delivery pipe to the value corresponding to the operation of the contactor causing the starting of the motor. However, the provision of such an auxiliary tank wherein the liquid is subjected to an air pressure substantially increases the cost of the plant.

It is an object of the invention to eliminate the auxiliary air container while preventing frequent and rapid starting and stopping of the pump.

According to the present invention, the starting and the stopping at a fast rate of the motor of the motorpump set are eliminated and the need for an air container with its accessories is avoided, due to the provision of pressure reducing means which is operated by the flow of the liquid in the main pipe. Said pressure reducing means creates in the main pipe at least a zone in which the pressure of the liquid remains substantially constant for a large range of discharged quantities while the pressure varies suddenly when the discharge becomes slight, the switch controlling the motor of the motorpump being coupled to said zone and actuated by the pressure prevailing in said zone.

By way of example, several forms of embodiment of the invention are described hereafter and illustrated in the annexed drawing:

FIGURES 1 and 2 relate to known devices.

FIGURES 3 and 4 illustrate the principle of the invention.

FIGURE 5 shows in section an arrangement in one piece including the relief-valve and the additional airchamber.

FIGURES 6a and 6b show in section apparatus including the relief-valve, the air chamber and the manometric contactor in two different positions.

FIGURE 8 shows in section another form of embodiment of a device mounted in an arrangement according to the invention.

Figure 6B:
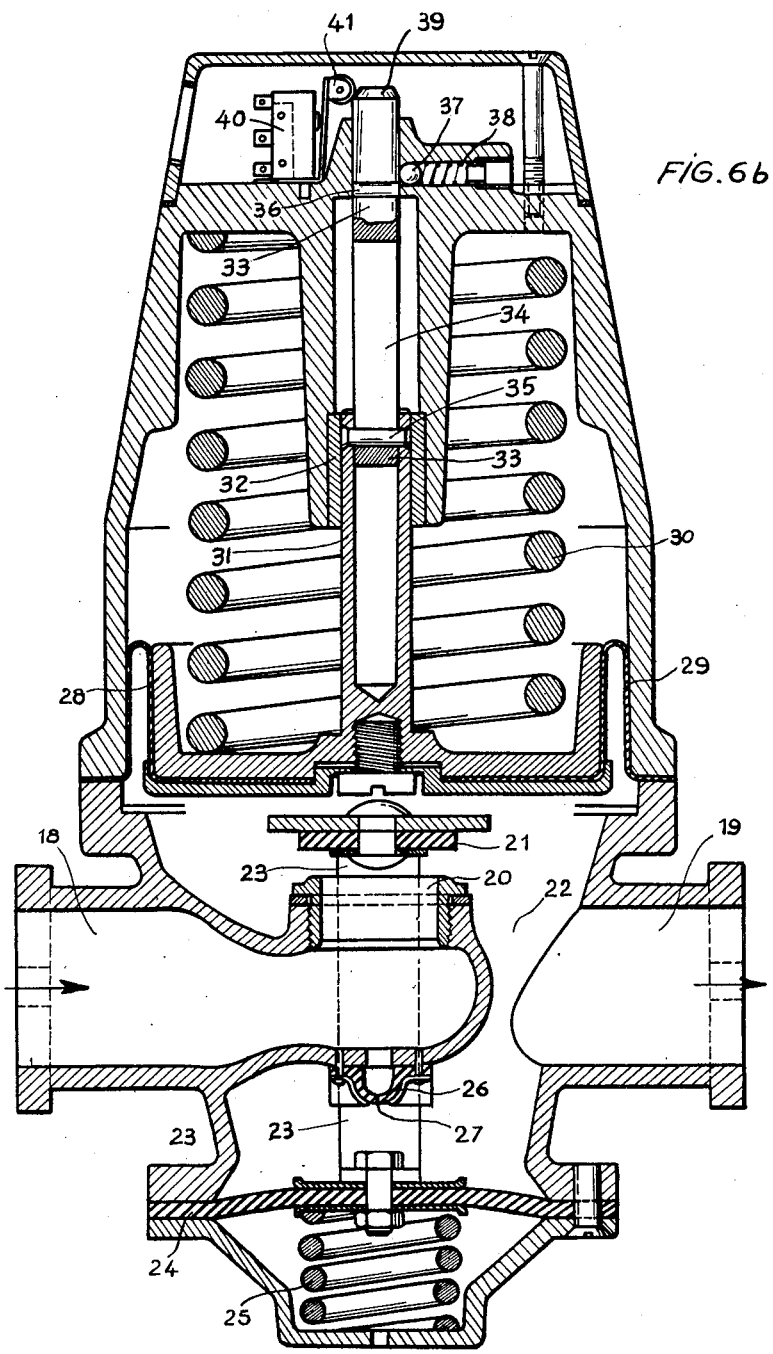

In the known arrangement diagrammatically shown in FIG. 1, a motor pump 1 draws up water through pipe 2 and discharges same in a pipe 3 to feed the delivery valves 4, the pipe 3 being provided with a manometric contactor 5 to control the starting and the stopping of the motor pump 1 responsive to the discharge pressure in the main pipe 3. FIG. 2 shows the curve QH representing the variations of the pressure H of a centrifugal pump as a function of the output Q delivered through the discharge pipe 3. The contactor 5 is adjusted to stop the motor pump 1 when the discharge pressure reaches the value $h'$ corresponding to an output $Q'$ (point D), and to start the motor pump when the discharge pressure drops to the value $h''$ corresponding to an output $Q''$ (point E). Due to the shape of the curve, the output $Q'$ corresponding to the stopping of the pump is relatively important in order to make the corresponding pressure $h'$ sufficiently smaller than the pressure $h$ corresponding to a zero output so as to provide with the desired security the stopping of the pump before the pressure $h$ is reached, resulting in that a flow smaller than $Q'$ but which may not be negligible, caused for instance by a slight opening of one of the delivery valves, will cause a rapid drop of pressure in the pipe 3 down to value $h''$ thereby resulting in a starting of the motor pump, and then a rapid rise of pressure up to value $h'$ and consequently the stopping of the motor pump and so on. In the known arrangements the above rapid succession of starts and stops of the pump is usually prevented by an auxiliary air pressure container connected to pipe 3 and refilled at each operation of the pump with an amount of water which is sufficient to compensate during a certain time interval a small flow of water so as to delay the drop of pressure in the main delivery pipe 3.

The arrangement according to the invention comprises, as diagrammatically shown in FIG. 3, a pressure reducing valve 7 inserted in the main delivery pipe 3 between the motor pump 1 and the pressure responsive contactor 5.

As shown in FIG. 4, the pressure reducing valve 7 allows a constant pressure P to be maintained in pipe 3 downstream of said valve, whatever be the discharge pressure of the pump, said pressure being rapidly raised to the value $h'$ corresponding to the stopping of the pump only when this output flow drops to a very small value $Q^1$ corresponding to quite unusual conditions, for instance to a small drop by drop leakage of a delivery valve 4. Due to the presence of the pressure reducing valve 7, the pressure P between the pressure $h''$ corresponding to the starting of the pump and the pressure $h'$ corresponding to the stopping thereof is maintained in pipe 3 for large ranges of output flow, thus preventing a rapid succession of starts and stops of the pump for a relatively small water delivery. In order to delay the starting of the motor pump under the action of a drop by drop leakage of one of the delivery valves, and to further increase the interval between the successive stoppings and startings, a small auxiliary air pressure container 8 may be connected to the delivery pipe 3 downstream of the pressure reducing valve 7.

The operation of plant equipped with the pressure reducing valve 7 according to the invention is as follows:

When the motor-pump is stopped due to closure of the delivery valves, the pressure reducing valve is closed and the value of the pressure prevailing in pipe 3 downstream of valve 7 is equal to H (FIG. 4), i.e. to the maximum pressure of the pump corresponding to a zero flow. As soon as the delivery valve is opened, water accumulated in pipe 3 under pressure H flows through the delivery valve causing the pressure in said pipe to rapidly drop to value $h''$ (point E of the curve QH of FIG. 4) which causes the pressure responsive switch to start the motor-pump which feeds water to pipe 3 through the pressure reducing valve 7. If the value of the flow determined by the opening of the delivery valve is between $Q''$ and $Q'$, the pressure in pipe 3 is rapidly raised to point K along the curve QH corresponding to the raising of the discharge pressure of the pump, whereafter the pressure remains practically constant and equal to P due to the operation of the pressure reducing valve 7 whereby the curve representing the pressure prevailing in pipe 3 in terms of the delivery flow is now the horizontal portion P. If the delivery valve is closed and the flow drops below the value $Q^1$, the pressure reducing valve is no longer able to maintain the pressure in the pipe 3 at the value P, said pressure raises suddenly up to the value $h^1$ causing the pressure responsive switch to stop the pump whereas the pressure reducing valve is closed again. Briefly speaking, the motor-pump is operative in a substantially large interval of flow values between the value $Q''$ which is near to the maximum flow value and a value $Q^1$ which is rarely encountered and which may correspond to a leakage of water due, for instance, to poor closure of a delivery valve. It is thus clear that if the output flow caused by the opening of a delivery valve has a usual but small value (i.e. greater than $Q^1$), the motor-pump will be continuously operated and the rapid succession of stops and starts characterizing the operation of the known pumps will be completely eliminated.

The relief-valve 7 illustrated in FIGURE 5 includes, in a known way, a resilient diaphragm 10, a spring 11 which can be adjusted by means of a hand-wheel 12 and a valve member 13 connected to the diaphragm 10. In addition, according to the invention, the relief-valve 7 is provided with a calibrated port 14 connecting the parts of the pipe 3 upstream and downstream of the relief-valve 7, the valve 7 being also combined with a selector for the direction of flow sense of the liquid, constituted by a valve member such as a ball 15.

The air contained in the air chamber 8 is isolated from the circuit of water by a resilient diaphragm 16 and the air chamber can be filled up, through the valve 17, with air under a predetermined pressure, by means of any suitable device.

The manometric contactor 5 (FIGURE 1) is connected with the main pipe 3 between the relief-valve 7 and the drawing cocks 4: it is for instance connected with the port 9 provided downstream of the relief-valve 7. This contactor 5 is designed so that, when the pressure, before the cock 4, falls below a given value, it brings about the closing of the circuit of the motor of the motor pump set 1 and, inversely, it opens this circuit as soon as this pressure rises above a value also predetermined.

The arrangement above described works as follows:

The motor pump set 1 being stopped, the opening of one of the cocks 4 brings about a drop of pressure in the pipe 3, between the relief-valve 7 and this cock 4. As soon as this drop of pressure reaches a given value, the contactor 5 closes automatically the circuit of the motor pump set which discharges towards the relief-valve 7. This relief-valve feeds the pipe 3, downstream and under an unchanging pressure P, towards the cocks 4. As soon as the cock 4 is closed, the valve member 13 of the relief-valve 7 closes the corresponding port but the pressure existing upstream of the relief-valve 7 is transmitted downstream through the calibrated port 14, to reach normally the pressure H (FIG. 4). Nevertheless, as the manometric contactor 5 is adjusted to cut the circuit of the motor under a slightly lower pressure $h'$, this cut-off takes place as soon as the pressure $h'$ is reached. A new opening of the cock 4 brings about the same operation as previously described.

It is to be noted that the selector of the flowing sense 15 will prevent the drop of pressure downstream of the relief-valve 7 if the pipe upstream of this relief-valve becomes empty in consequence of a lack of tightness of the foot-valve of the suction pipe 2.

FIGURE 6 shows a form of embodiment in which the relief-valve is designed to act also as a contactor. An arrangement in one piece includes an inlet 18 for the fluid under pressure supplied by the pump and an outlet 19, the inlet 18 and the outlet 19 communicating through a seat 20 controlled by a clack-valve 21 and through a chamber 22. The clack-valve 21 is connected by means of a member 23 with a preferably resilient diaphragm 24 which, on one face is under the influence of the pressure existing in chamber 22 and on the other face is under the influence of a spring 25. A selector for the flowing sense, forming the small connection between the upstream and the downstream of the relief-valve, is constituted by a preferably resilient teat 27, which allows the communication from upstream downstream but prevents it in the reverse direction.

The chamber 22 at its upper part extends in front of a piston 28 combined with a, preferably supple or resiliently distortable, tightening wall 29. The piston 28 is under the action of a spring 30 and its tubular but blind rod 31 can move vertically in a bore 32. In the tubular part of the rod 31 is engaged a stem 33 connected with the rod 31 to move with it but with a long dead motion thanks to an oblong slot 34 provided in the stem 33 and in which is engaged a transverse rivet 35 integral with the rod 31.

The stem 33 is provided with a groove 36 allowing its locking by a ball 37 placed under action of a spring 38 and its bevelled upper end 39 can act upon a contact 40 by means of a blade-roller 41.

At the upper left part of FIGURE 6, the piston 28 and the stem 33 are shown in the lower position, the stem 33 being unlocked and the contact 40 being closed (motor working), as the stem 33 has released the blade roller 41.

At the upper right part, the piston is in the upper position and also the stem 33 which is locked and actuates the blade-roller 41 so that the contact 40 is cut off and the motor is stopped.

The apparatus works as follows:

The piston 28 being supposed to be in its upper position, the contact of the motor 40 being cut off, the normal opening of a drawing cock 4 brings about initially the discharge of the whole chamber 22 and in same time, the motion downwards of the piston 28, which, at stroke's end, unlocks the stem 33 and brings about the closing of the circuit of the motor. The pump discharges, the clack-valve 21 is lifted and the supply with water is carried on normally under an even pressure.

If the drawing cock is progressively shut and at a rather reduced discharge value, the clack-valve 21 will close and the supply is furnished only through the teat 27, the opening of which opens more or less in function of the value of the opening of the drawing cock. The pump continues its discharge through the teat 27 during some time and brings about the upwards motion of the piston 28 which, at stroke's end, drives the stem 33 up to its locking position, corresponding to the opening of the circuit of the motor.

In case of a leakage, drop by drop, the startings and stoppings can take place only after a long time interval on account of the time required for the total discharge of the chamber 22 between each operation: said chamber constitutes a spring operated chamber instead of an air chamber and produces thereby a damping.

Figure 7:
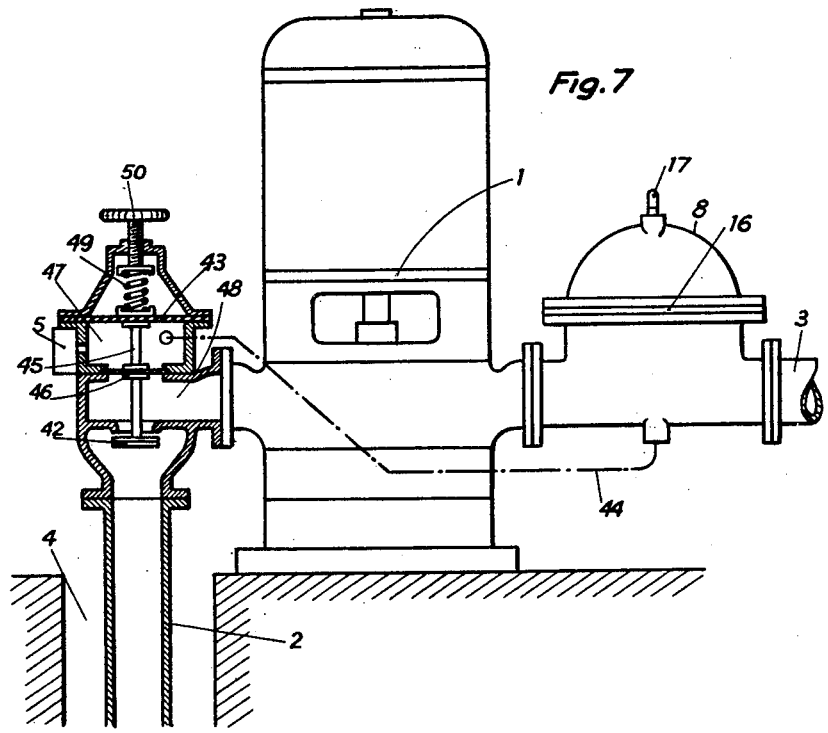
FIGURE 7 shows, partly in section, a modified arrangement.

FIGURE 7 illustrates another form of embodiment in which, in the suction pipe 2, is disposed a clack-valve 42 controlled by a diaphragm which is subjected to the pressure existing in the main pipe 3, thanks to a connection supplied by a tube 44. The stem 45 of the clack-valve 42 can pass through a stuffing-box in 46 but this stuffing-box may advantageously be replaced by a diaphragm 46 which secures an efficient time tightness between the chamber 47 and the passage 48 situated between the pipe 2 and the suction of the motor pump set 1. The surface of the diaphragm 46 is much smaller than the surface of the diaphragm 43 which, in addition, is subjected to the action of a spring 49, which can be adjusted by means of a hand-wheel 50.

An air chamber 8, with a diaphragm 16 is disposed, as shown, between the discharge of the pump 1 and the main pipe 3.

This device works as follows:

When the pressure drops below a given value in the pipe 3 and in the chamber 47, as a result of the opening of a cock, the manometric contactor 5 closes the circuit of the motor of the set 1 and the pump sucks through the pipe 2. The pressure increases in the main pipe 3, according to the number of cocks in action, so that the throttling produced by the clack-valve 42 is inversely proportional to the value of this pressure. When the last cock is closed, the pressure in the pipe 3 and in the chamber 47 is at its utmost and brings about, through the manometric contactor 5, the opening of the circuit of the motor of the set 1.

FIGURE 8 illustrates another embodiment in which between the motor pump set 1 and the drawing cock or cocks 4, there is provided in pipe 3 an hydro-ejector 51, including a nozzle 52 and a diverging cone 53, a check-valve 54 being also preferably, but not necessarily, provided upstream. The chamber 55, encircling the nozzle 52, communicates through a channel 56 with the manometric contactor 5 (not shown) in FIG. 5) which controls the circuit of the motor-pump set 1.

This device works as follows:

The opening of the cock 4 brings about a pressure drop in the chamber 55: when this pressure comes below a given value, the manometric-contactor 5 closes the circuit of the motor-pump set 1. The pump discharges then in the pipe 3, lifting the check-valve 54 and passing through the hydro-ejector 51, thus allowing to maintain in the chamber 56 a depression, the value of which remains about even in a wide range of delivery and is sufficient to maintain the manometric contactor 5 in the position closing the circuit of the motor. As soon as the drawing cock 4 is closed, the pressure supplied by the pump is spread in the whole pipe 3 and in the chamber 55, to reach the manometric contactor 5 and to close thereby the circuit of the motor.

Figure 9:
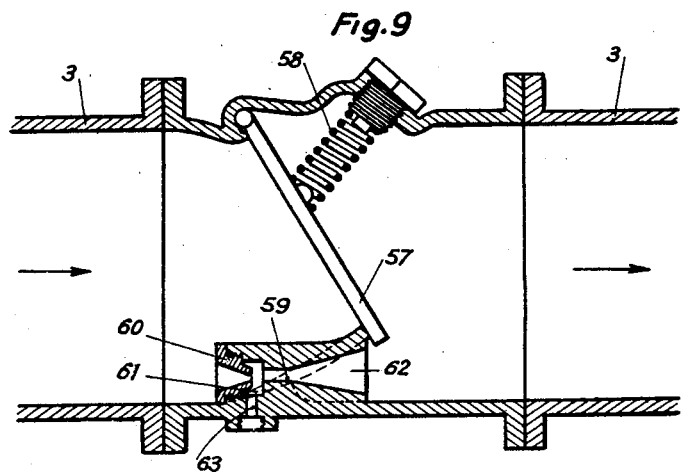
FIGURE 9 illustrates in section another form of embodiment.

FIGURE 9 illustrates another form of embodiment in which a check-valve 57 is calibrated by a spring 58; a by-pass establishing a connection upstream downstream is constituted by a hydro-ejector 59 including a nozzle 60, a chamber 61 and a diverging cone 62, the chamber 61 communicating through a channel 63 with the manometric contactor 5 (not shown).

The working, similar to the working of FIGURE 8, is as follows:

At the opening of the drawing cock, the pressure downstream of the check valve 57 falls and brings about a flowing, in the sense upstream-downstream, through the hydro-ejector 59, thereby producing a sufficient depression to bring about, through action of the manometric contactor, the closing of the circuit of the motor. The pressure rises then upstream of the check-valve 57 and brings about against the action of the spring 58, the opening of the check-valve 57, a part of the flow passing nevertheless through the hydro-ejector 59, to keep closed the circuit of the motor. As soon as the drawing cock is closed, the pressure becomes maximum in the main pipe 3 and is balanced upstream and downstream of the check valve 57, the flowing stopping in the hydro-ejector 59. This pressure, which then exists in chamber 61, acts upon the manometric contactor, closing thereby the circuit of the motor.

What we claim is:

1. Apparatus for the delivery of liquid including an electric motor, a pump driven by said motor, a pipe in which said pump discharges under pressure said liquid, drawing cocks connected to said pipe, a pressure reducing valve mounted on said pipe between the pump and the cocks and including a chamber, a lead-in pipe connected with the pump and opening in said chamber to form a seat therein at the open end of the pipe, an outlet pipe connected with the discharge pipe, a valve member adapted to close the seat of the lead-in pipe and subjected, in the direction of the closing, to the pressure existing in the discharge pipe downstream of said valve, a calibrated spring acting upon said valve member in the direction of the opening, a passage having a small section provided in said lead-in pipe to establish direct communication between the pump and the inside of the chamber of the relief-valve and including flow direction selecting means for preventing flow of liquid from the valve chamber to the lead in pipe and a pressure switch connected with the discharge pipe downstream of the pressure reducing valve and controlling the starting and the stopping of the electric motor of the pump.

2. Apparatus for the delivery of liquid including an electric motor, a pump driven by said motor, a pipe in which said pump discharges under pressure said liquid, drawing cocks connected to said pipe, a pressure reducing valve mounted on said pipe between the pump and the cocks and including a chamber, a lead-in pipe connected with the pump and opening in said chamber to form a seat therein at the open end of the pipe, an outlet pipe connected with the discharge pipe, a valve member adapted to close the seat of the lead-in pipe and subjected, in the direction of the closing, to the pressure existing in the discharge pipe downstream of said valve, a calibrated spring acting upon said valve member in the direction of the opening, a passage having a small section provided in said lead-in pipe to establish direct communication with the inside of the chamber of the pressure reducing valve and including flow direction selecting means, constituted by a small cap of resilient material in the shape of a teat, and provided with a slit in its top, and a pressure switch connected with the discharge pipe downstream of the pressure reducing valve and controlling the starting and the stopping of the electric motor of the pump.

3. Apparatus for the delivery of liquid including an electric motor, a pump driven by said motor, a pipe in which said pump discharges under pressure said liquid, drawing cocks connected to said pipe, a pressure reducing valve mounted on said pipe between the pump and the cocks and including a chamber, a lead-in pipe connected with the pump and opening in said chamber and forming a seat therein, an outlet pipe connected with the discharge pipe, a valve member adapted to close the seat of the lead-in pipe and subjected, in the direction of the closing, to the pressure existing in the discharge pipe downstream of said valve, a calibrated spring acting upon said valve member in the direction of the opening, a passage having a relatively small section provided in said lead in pipe to establish direct flow from the valve chamber to the lead in pipe and including flow direction selecting means adapted to prevent flow of liquid through said passage from the valve chamber to said lead in pipe, a resilient diaphragm separating the chamber of the relief-valve in two compartments, one of which contains said valve member and the other of which is provided with a valve to introduce compressed air and to form thereby an auxiliary air chamber, and a pressure switch connected with the discharge pipe downstream of the pressure reducing valve and controlling the starting and the stopping of the electric motor of the pump.

4. Apparatus for the delivery of liquid including an electric motor, a pump driven by said motor, a pipe in which said pump discharges under pressure said liquid, drawing cocks connected to said pipe, a pressure reducing valve mounted on said pipe and constituted by a chamber, two resilient diaphragms separating said chamber into three compartments one above another, a spring disposed in the lower of the compartments to act upon the corresponding diaphragm, a lead-in tube for the liquid connected with the pump and penetrating in the center one of the compartments, an outlet tube connected with the discharge pipe, a valve member integral with said diaphragm loaded by said spring and disposed to obturate the end of the lead-in tube under action of the pressure existing in said chamber and against the action of said spring, a port having a small section provided in said lead-in tube to establish a direct communication between said pipe and the center compartment, flow direction selecting means mounted on said port and constituted by a teat, a piston solid with the second diaphragm separating the center compartment from the upper of the compartments, a second spring loading said piston, a tubular rod solid with said piston and guided outside said chamber, and an electric switch fixed on the outside of said chamber and actuated by said rod under action of the pressure existing in the center compartment of the chamber and controlling the starting and the stopping of the motor of the pump.

5. Apparatus for the delivery of liquid including an electric motor, a pump driven by said motor, a pipe in which said pump discharges under pressure said liquid, drawing cocks connected to said pipe, a pressure reducing valve mounted on said pipe and constituted by a chamber, two resilient diaphragms separating said chamber into three compartments one above another, a spring disposed in the lower of the compartments to act upon the corresponding diaphragm, a lead-in tube for the liquid connected with the pump and penetrating in the center one of the compartments, an outlet tube connected with the discharge pipe, a valve member integral with said diaphragm loaded by said spring and disposed to obturate the end of the lead-in tube under action of the pressure existing in said chamber and against the action of said spring, a port having a small section provided in said lead-in tube to establish a direct communication between said pipe and the center compartment, flow direction selecting means mounted on said port and constituted by a teat, a piston solid with the second diaphragm separating the center compartment from the upper compartment, a second spring loading said piston, a tubular rod solid with said piston, means to guide the motions of said rod in the upper compartment, a stem sliding in said tubular rod and connected with clearance with said rod, means to guide said stem through the upper wall of the chamber, an electric switch fixed on said wall and actuated by said stem to control the starting and the stopping of the motor of the pump, and a locking device including ball and spring to block said control stem in the position corresponding to the opening of the switch.

References Cited in the file of this patent
UNITED STATES PATENTS

| | | |
|---|---|---|
| 1,462,159 | Aikman | Jan. 17, 1923 |
| 2,594,833 | White | Apr. 29, 1952 |
| 2,761,389 | Turner | Sept. 4, 1956 |